United States Patent
Heck et al.

(10) Patent No.: US 9,605,627 B2
(45) Date of Patent: Mar. 28, 2017

(54) AIR FILTER CLEANING WAND

(71) Applicant: K&N Engineering, Inc., Riverside, CA (US)

(72) Inventors: Gilbert Heck, Nuevo, CA (US); Amir Rosenbaum, Los Altos Hills, CA (US)

(73) Assignee: K&N Engineering, Inc., Riverside, CA (US)

( * ) Notice: Subject to any disclaimer, the term of this patent is extended or adjusted under 35 U.S.C. 154(b) by 35 days.

(21) Appl. No.: 14/231,343

(22) Filed: Mar. 31, 2014

(65) Prior Publication Data
US 2015/0275829 A1     Oct. 1, 2015

(51) Int. Cl.
| | | |
|---|---|---|
| *B01D 29/62* | (2006.01) | |
| *B01D 35/16* | (2006.01) | |
| *B05B 1/00* | (2006.01) | |
| *F16L 11/00* | (2006.01) | |
| *F16L 11/10* | (2006.01) | |
| *F02M 35/08* | (2006.01) | |
| *B01D 46/00* | (2006.01) | |

(52) U.S. Cl.
CPC ....... *F02M 35/086* (2013.01); *B01D 46/0071* (2013.01); *B01D 46/0082* (2013.01)

(58) Field of Classification Search
CPC ...... B01D 29/62; B01D 29/661; B01D 35/16; B01D 41/00; B01D 46/0038; B05B 1/00; B05B 15/063; B05B 1/3013; B08B 3/026; B65H 75/364; A01G 25/16; F16L 11/00; F16L 11/10
USPC ............ 15/104.05; 210/409, 791; 239/489; 134/166 C; 137/244, 355.28; 285/123, 1; 138/109
See application file for complete search history.

(56) References Cited

U.S. PATENT DOCUMENTS

| | | | | |
|---|---|---|---|---|
| 2,334,141 A * | 11/1943 | Zierden | ................ | B65H 75/364 137/355.28 |
| 2,712,325 A * | 7/1955 | Andrus | .................. | A01G 25/16 137/244 |
| 8,597,435 B2 * | 12/2013 | Schreiber | ............... | B01D 41/00 134/166 R |
| 2004/0004035 A1 * | 1/2004 | Leckal | ................... | B01D 29/62 210/409 |
| 2004/0261849 A1 * | 12/2004 | Sprague | .................. | E03B 7/006 137/239 |

(Continued)

*Primary Examiner* — Jacob T Minskey
*Assistant Examiner* — Minh-Chau Pham
(74) *Attorney, Agent, or Firm* — Rutan & Tucker LLP; Hani Z. Sayed

(57) ABSTRACT

An apparatus and a method are provided for an air filter cleaning wand for flushing contaminants from an intake air filter of an automobile engine. The air filter cleaning wand comprises a proximal flange, a conduit, and a distal end portion. The proximal flange is configured to receive a nozzle of a water hose. An interior of the conduit is in fluid communication with the proximal flange. The distal end portion comprises a plurality of longitudinally aligned vents in fluid communication with the interior of the conduit. Upon passing water through the water hose and into the conduit, pressurized water streams exit the vents along the distal end portion so as to flush contaminants from the air filter. The air filter cleaning wand advantageously is comprised of a material which is sufficiently durable and temperature resistant to retain its configuration during operation when coupled to pressurized water sources.

20 Claims, 3 Drawing Sheets

(56) References Cited

U.S. PATENT DOCUMENTS

| | | | | |
|---|---|---|---|---|
| 2009/0039181 | A1* | 2/2009 | Auer, Jr. | B08B 3/026 |
| | | | | 239/589 |
| 2010/0316433 | A1* | 12/2010 | Castellana | A46B 11/0006 |
| | | | | 401/268 |
| 2012/0006917 | A1* | 1/2012 | Carr | B05B 15/063 |
| | | | | 239/754 |
| 2012/0192980 | A1* | 8/2012 | Williams | F16L 55/11 |
| | | | | 138/89 |
| 2013/0113205 | A1* | 5/2013 | Berardi | F16L 11/10 |
| | | | | 285/123.1 |
| 2013/0213514 | A1* | 8/2013 | Berardi | F16L 11/00 |
| | | | | 138/109 |
| 2014/0000045 | A1* | 1/2014 | Bunting | B01D 35/16 |
| | | | | 15/104.05 |
| 2015/0001165 | A1* | 1/2015 | Duenas | B01D 41/04 |
| | | | | 210/791 |
| 2015/0273379 | A1* | 10/2015 | McVay et al. | B01D 46/0038 |
| | | | | 96/108 |
| 2015/0360244 | A1* | 12/2015 | Scheelhaase | B05B 1/3013 |
| | | | | 239/562 |

\* cited by examiner

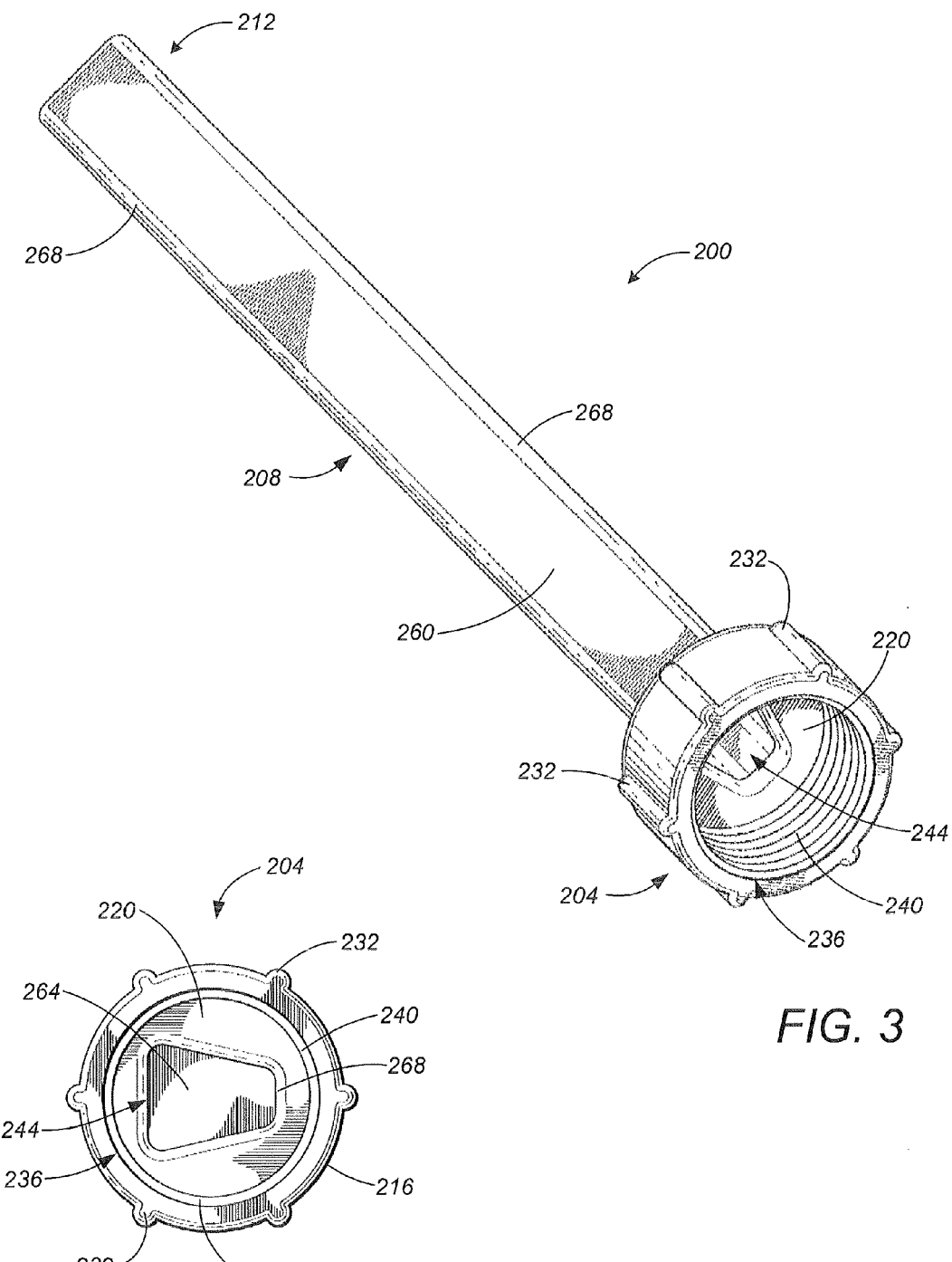

AIR FILTER CLEANING WAND

FIELD

The field of the present invention generally relates to cleaning devices. More particularly, the field of the invention relates to an apparatus and a method for an air filter cleaning wand for flushing contaminants from an intake air filter of an automobile engine.

BACKGROUND

An air filter designed to remove particulate is generally a device composed of fibrous materials. These fibrous materials may remove solid particulates such as dust, pollen, mold, and bacteria from the air. Air filters are used in applications where air quality is important, notably in building ventilation systems and in automobile engines.

Air filters may be used in automobiles, trucks, tractors, locomotives and other vehicles that use internal combustion engines. Air filters may be used with gasoline engines, diesel engines, or other engines that run on fossil fuels or other combustible substances. Air filters may be used with engines in which combustion is intermittent, such as four-stroke and two-stroke piston engines, as well as other types of engines that take in air so as to burn a combustible substance. For example, air filters may be used with some gas turbines. Filters may also be used with air compressors or in other devices that take in air.

Filters may be made from pleated paper, foam, cotton, spun fiberglass, or other known filter materials. Generally, the air intakes of internal combustion engines and compressors tend to use paper, foam, or cotton filters. Some filters use an oil bath. Air filters for internal combustion engines prevents abrasive particulate matter from entering the engine's cylinders, where it would cause mechanical wear and oil contamination. Many fuel injected engines utilize a flat panel pleated paper filter element. This filter is usually placed inside an enclosed, plastic box connected to a throttle body by way of ductwork. Vehicles that use carburetors or throttle body fuel injection systems typically use a cylindrical air filter positioned above the carburetor or the throttle body.

A drawback to enclosed air boxes that require flat panel paper filters is that air flow through the filter becomes restricted as particular matter builds up in the filter. Such a restricted air flow generally leads to a reduction in engine performance, such as a decrease in engine power output and greater fuel consumption. Moreover, as the paper filter becomes increasingly clogged, pressure inside the filter decreases while the atmospheric air pressure outside the filter remains the same. When the difference in pressure becomes too great, contaminants may be drawn through the paper filter directly into the engine. Thus, the ability of the paper filter to protect the engine from contamination and internal damage tends to decrease near the end of the filter's service life. Typically, paper air filters are removed from the vehicle and discarded, and a new paper air filter is then installed. Considering that there are millions of vehicles throughout the world, the volume of discarded air filters that could be eliminated from landfills is a staggering number. Another drawback to enclosed air boxes is that they typically draw air through a tortuous path of hoses or ductwork before the air enters the intake of the engine. In some cases, the air box is a greater source of air restriction than is the paper filter. Similar to a contaminated air filter, a restrictive air box decreases engine performance and fuel economy.

FIG. 1 illustrates an exemplary embodiment 100 of an air box 104 with an integrated air filter 108 which solves the above-mentioned drawbacks to conventional air filters. The air box 104 comprises a housing portion 112 and a mount portion 116. The air box 104 generally is comprised of a material which is sufficiently durable and temperature resistant to retain its configuration during installation and operation when coupled with the air intake system of an automobile. The air box 104 generally is of an open variety, thereby improving airflow to the air filter 108, and thus improving engine performance beyond that otherwise possible with an enclosed air box. The mount portion 116 generally is configured to be mounted, or fastened, to the interior of an automobile engine bay.

The housing portion 112 generally is configured to support the air filter 108 and provide an interface between the air filter 108 and an intake portion of an automobile engine. A front side of the housing portion 112 comprises a conduit 120 that is configured to receive an air intake conduit extending to the intake portion of the automobile engine. Typically, a longitudinal dimension of the conduit 120 is positioned at an angle relative to the housing portion 112. Generally, the value of the angle between the conduit 120 and the housing portion 112 depends upon the particular automobile for which the air box 104 is to be utilized. Further, the conduit 120 comprises a flange 128 and an opening 132. The opening 132 serves the function of conducting air drawn through the air filter 108 into an interior cavity 136 of the filter into the air intake of the automobile engine. The specific configuration of the flange 128 and a diameter of the opening 132 generally depend upon the particular make and model of the engine for which the air box 104 is to be utilized.

With continuing reference to FIG. 1, the air filter 108 comprises a filter material 156 and a distal end cap 164. The distal end cap 164 may be affixed to the filter material 156 by way of any of a variety of fasteners (not shown), or may be molded to of the air filter 108. The distal end cap 164 typically is comprised of a material which is sufficiently hard so as to retain the filter material 152 in the desired configuration and support the air filter 108 when coupled to the housing portion 112. As shown in FIG. 1, the filter material 156 circumferentially surrounds the interior cavity 136 such that the filter material 156 creates an exterior perimeter of at least a portion of the interior cavity 136. The filter material 156 generally provides a surface area through which to pass an air stream and trap particulate matter and other contaminates so as to prevent them from entering into the air intake of the automobile engine.

It will be appreciated that a user of the air box 104 may periodically clean the air filter 108 rather than replacing the air filter, as is typically done with conventional air filter systems. A straightforward method for cleaning the air filter 108 comprises removing the air intake conduit of the automobile engine from the conduit 120, inserting a water hose through the opening 132 into the interior cavity 136 of the filter, and spraying water so as to flush contaminants from the filter material 156. A drawback to this cleaning method is that the user must attempt to bend the hose inside the interior cavity 136 so as to direct the water stream onto the filter material 156. Bending the hose within a small area, such as the interior cavity 136, often causes the hose to crimp, thereby reducing water flow and consequently hindering effectively cleaning the air filter 108.

Another drawback to bending the hose within the interior cavity 136 is that generally the user will not be able to uniformly clean the filter material 156. In an attempt to avoid crimping the hose, the user may consider using a water nozzle which directs the water stream at an angle relative to a longitudinal axis of the hose. However, typically available water nozzles, such as garden-variety nozzles, are often too big to fit through the opening 132 of the conduit 120 and into the interior cavity 136. Moreover, many garden-variety water nozzles have sharp edges and bulky features which may damage or even puncture the filter material 156, thereby ruining the air filter 108. What is needed, therefore, is an air filter cleaning device to flush contaminants from an intake air filter of an automobile engine without damaging the air filter material.

SUMMARY

An apparatus and a method are provided for an air filter cleaning wand for flushing contaminants from an intake air filter of an automobile engine. The air filter cleaning wand comprises a proximal flange, a conduit, and a distal end portion. The proximal flange is configured with an interior opening to receive a nozzle of a water hose. In one embodiment, the proximal flange is a threaded female hose coupling configured to receive a garden hose. In other embodiments, the proximal flange may be a male hose coupling, such as a threaded male coupling to receive a female coupling of a garden hose, or a fitting configured to receive a push-on hose and fastened by way of a hose clamp. The conduit comprises an elongate member extending from the proximal flange to a distal end cap. In an embodiment, the conduit has a trapezoidal cross-sectional shape, although in other embodiments the cross-sectional shape may be rectangular, triangular, circular, ellipsoidal, or polygonal. An interior of the conduit is in fluid communication with the interior opening of the proximal flange. The distal end portion of the conduit comprises a plurality of longitudinally aligned vents in fluid communication with the interior of the conduit. The individual vents preferably comprise openings in the conduit having a circular shape, although other shapes may be used, such as rectangular, triangular, ellipsoidal, or polygonal. Upon passing water through the water hose and into the conduit, the water exits the vents in the form of pressurized water streams suitably positioned along the distal end portion to flush contaminants from the air filter. The air filter cleaning wand is advantageously comprised of a material which is sufficiently durable and temperature resistant to retain its configuration during operation when coupled to pressurized water sources. The proximal flange further comprises a plurality of grip structures disposed around the periphery of the proximal flange to facilitate installing the air filter cleaning wand onto the water hose.

In an exemplary embodiment, an apparatus for an air filter cleaning wand comprises a proximal flange configured to receive a nozzle of a water hose; a conduit comprising an elongate member extending from the proximal flange to a distal end cap, where an interior of the conduit is in fluid communication with an interior opening of the proximal flange; and a distal end portion of the conduit comprising a plurality of vents in fluid communication with the interior of the conduit; where upon passing water through the water hose and into the conduit, the water exits the plurality of vents in the form of pressurized water streams suitably disposed along the distal end portion to flush contaminants from a filter material of an air filter.

In another exemplary embodiment, the air filter cleaning wand is comprised of a material which is sufficiently durable and temperature resistant to retain its configuration during operation when coupled with a pressurized water source, such as a garden hose. In another exemplary embodiment, the conduit comprises a top wall, a bottom wall, a front wall, a back wall, and a distal cap, all of which walls being joined by intervening rounded edges so as to eliminate sharp edges which may otherwise damage the air filter during cleaning. In another exemplary embodiment, the walls are joined such that the conduit has a trapezoidal cross-sectional shape. In another exemplary embodiment, the conduit has a cross-sectional shape comprising rectangular, triangular, circular, ellipsoidal, or polygonal.

In another exemplary embodiment, the proximal flange comprises a cylindrical portion and a mount plate joined by a smooth transition. In another exemplary embodiment, the interior opening of the proximal flange is distally bounded by a mount plate and peripherally bounded by the cylindrical portion, where the interior opening is formed such that an interior surface of the cylindrical portion includes a plurality of threads, and the mount plate includes a passage from the interior opening to an interior of the conduit. In another exemplary embodiment, the proximal flange further comprises a plurality of grip structures disposed around the periphery of the cylindrical portion. In another exemplary embodiment, specific dimensions incorporated into the proximal flange depend upon a particular male hose fitting to which the proximal flange is intended to be coupled.

In another exemplary embodiment, the proximal flange is configured to be coupled with a garden hose. In another exemplary embodiment, the proximal flange is configure to be a threaded female hose coupling. In another exemplary embodiment, the proximal flange is configured to be a threaded male hose coupling. In another exemplary embodiment, the proximal flange is configured to receive a push-on hose and fastened by way of a hose clamp.

In another exemplary embodiment, the vents are longitudinally arranged uniformly along the distal end portion of the conduit. In another exemplary embodiment, each of the individual vents comprises a circular opening in the front wall of the conduit. In another exemplary embodiment, each of the individual vents comprises an opening having a shape comprising rectangular, triangular, ellipsoidal, or polygonal. In another exemplary embodiment, a portion of the individual vents have adjustable shapes so as to alter the form of the pressurized water streams issued from the vents.

In an exemplary embodiment, a method for cleaning an air filter which is installed within an engine bay of an automobile comprises rotating a proximal flange of an air filter cleaning wand onto a male connector of a water hose so as to tightly engage threads of the proximal flange with threads of the male connector so as to establish a tight coupling of the air filter cleaning wand and the water hose; removing an air intake conduit of the automobile from the air filter, thereby exposing an interior cavity of the air filter; inserting a distal end portion of the air filter cleaning wand into the interior cavity of the air filter; passing water into the water hose, and then into a conduit of the air filter cleaning wand, such that the water exits the conduit by way of a plurality of vents in the form of pressurized water streams disposed along the distal end portion; using the pressurized water streams to flush contaminants from a filter material of the air filter; allowing the water and contaminants to drain from a bottom portion of the air filter and exit the engine bay; and allowing the air filter to become dry.

In another exemplary embodiment, using the pressurized water streams further comprises rotating the conduit to direct the pressurized water streams around the circumference of the filter material so as to flush the entirety of the air filter. In another exemplary embodiment, removing an air intake conduit further comprises spraying an air filter cleaner onto both sides of the filter material and allowing the air filter cleaner to soak into the filter material for a predetermined time period so as to loosen contaminants from the filter material. In another exemplary embodiment, allowing the air filter to become dry further comprises uniformly applying air filter oil to the filter material and allowing the air filter oil to wick into the filter material.

BRIEF DESCRIPTION OF THE DRAWINGS

The drawings refer to embodiments of the present invention in which:

FIG. 3 is a lower perspective view of an exemplary embodiment of an air filter cleaning wand, according to the present invention; and FIG. 4 is a longitudinal view of a proximal end of an exemplary embodiment of an air filter cleaning wand in accordance with the present invention.

Figure 1:
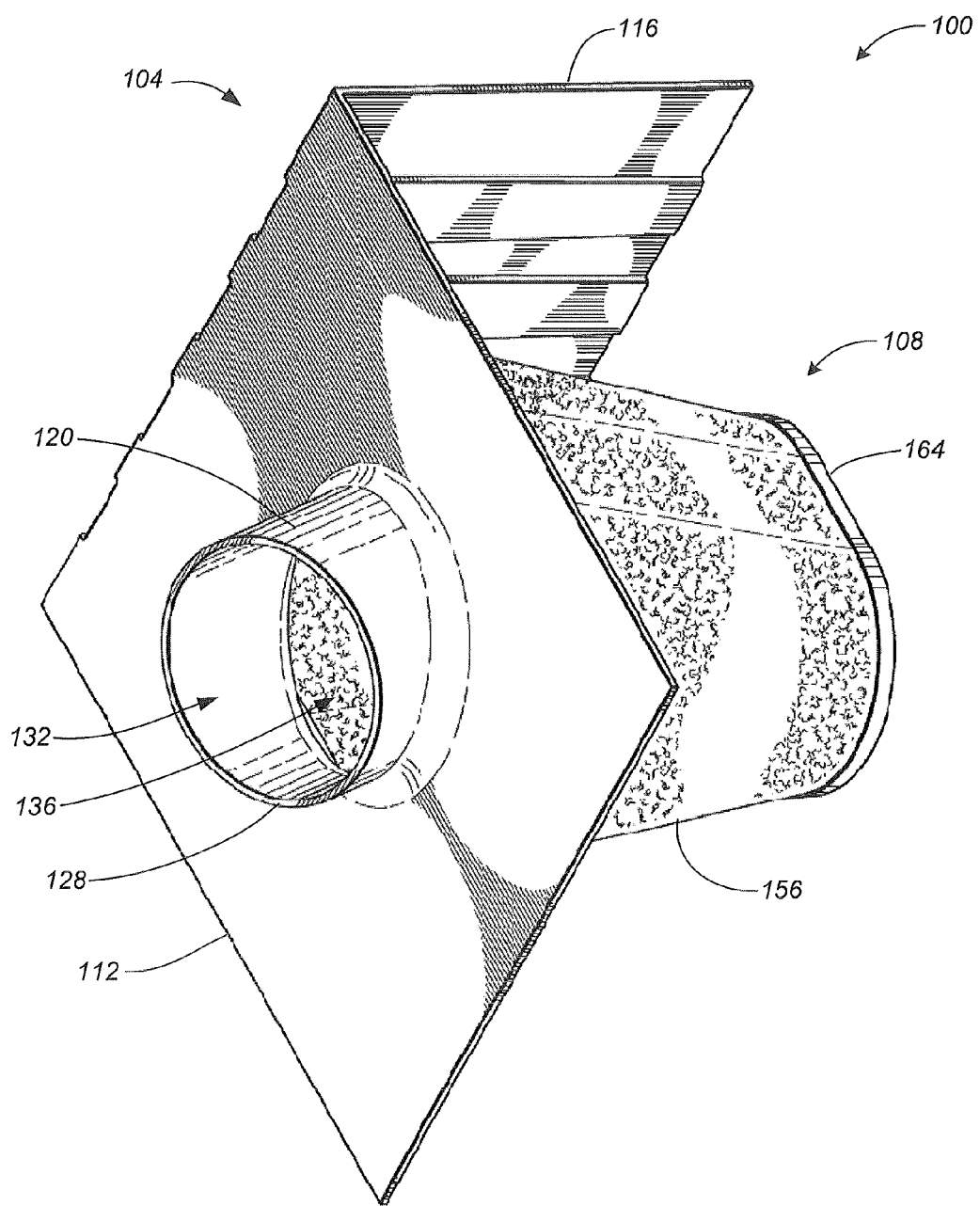
FIG. 1 is an upper perspective view of an exemplary embodiment of an air box with an integrated filter medium.

While the present invention is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the present invention.

DETAILED DISCUSSION

In the following description, numerous specific details are set forth in order to provide a thorough understanding of the present invention. It will be apparent, however, to one of ordinary skill in the art that the present invention may be practiced without these specific details. In other instances, well known components or methods have not been described in detail but rather in a block diagram, or a schematic, in order to avoid unnecessarily obscuring the present invention. Further specific numeric references such as "first driver," may be made. However, the specific numeric reference should not be interpreted as a literal sequential order but rather interpreted that the "first driver" is different than a "second driver." Thus, the specific details set forth are merely exemplary. The specific details may be varied from and still be contemplated to be within the spirit and scope of the present invention. The term "coupled" is defined as meaning connected either directly to the component or indirectly to the component through another component.

In general, the present invention describes an apparatus and a method for an air filter cleaning wand to flush contaminants from an intake air filter of an automobile engine. The air filter cleaning wand comprises a proximal flange, a conduit, and a distal end portion. The proximal flange is configured with an interior opening to receive a nozzle of a water hose. In one embodiment, the proximal flange is a threaded female hose coupling configured to receive a garden hose. In other embodiments, the proximal flange may be a male hose coupling, such as a threaded male coupling to receive a female coupling of a garden hose, or a fitting configured to receive a push-on hose and fastened by way of a hose clamp. An interior of the conduit is in fluid communication with the interior opening of the proximal flange. The distal end portion of the conduit comprises a plurality of longitudinally aligned vents in fluid communication with the interior of the conduit. Upon passing water through the water hose and into the conduit, the water exits the vents in the form of pressurized water streams suitably positioned along the distal end portion to flush contaminants from the air filter. The air filter cleaning wand is advantageously comprised of a material which is sufficiently durable and temperature resistant to retain its configuration during operation when coupled to pressurized water sources.

Figure 2:
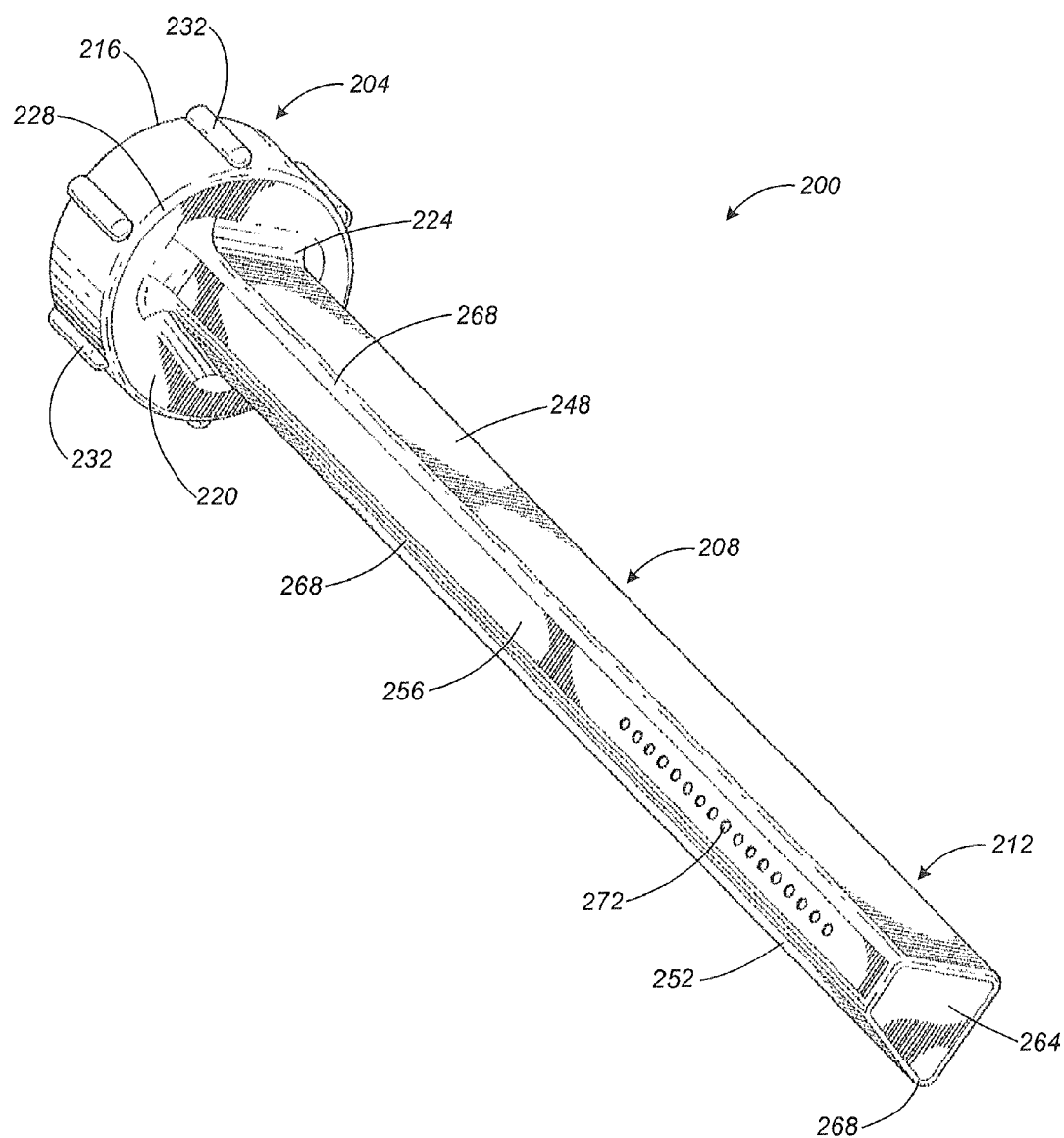
FIG. 2 is an upper perspective view of an exemplary embodiment of an air filter cleaning wand in accordance with the present invention.

FIGS. 2-3 are perspective views of an exemplary embodiment of an air filter cleaning wand 200 in accordance with the present invention. The air filter cleaning wand 200 generally is comprised of a material which is sufficiently durable and temperature resistant to retain its configuration during operation when coupled with a pressurized water source, such as a garden hose. Those skilled in the art will instantly recognize that the air filter cleaning wand 200 possesses a generally elongate configuration, and thus is particularly well suited for inserting into the opening 132 of the air filter 108.

The air filter cleaning wand 200 comprises a proximal flange 204 suitably configured to receive a water hose, a conduit 208, and a distal end portion 212. The proximal flange 204 comprises a cylindrical portion 216 and a mount plate 220. A transition 224 joins a proximal end of the conduit 208 to the mount plate 220. Similarly, a transition 228 joins the mount plate 220 to the cylindrical portion 216. As illustrated in FIG. 1, the transitions 224, 228 preferably are rounded and smooth so as to eliminate sharp edges which may otherwise damage the air filter 108 during cleaning. The proximal flange 204 further comprises a plurality of grip structures 232 disposed around the periphery of the cylindrical portion 216. Those skilled in the art will appreciate that the grip structures 232 facilitate a user grasping and rotating the proximal flange during installation onto a water hose, particularly when the flange is wet.

In the illustrated embodiment of FIGS. 2-4, there are six grip structures 232 arranged uniformly around the periphery of the cylindrical portion 216. In other embodiments, however, more or less than six grip structures 232 may be disposed on the cylindrical portion 216. In still other embodiments, the grip structures 232 may be arranged other than uniformly around the periphery of the cylindrical portion 216. It should be understood that the grip structures 232 may be comprised of shapes, sizes, and arrangements other than as shown in FIGS. 2-4, without deviating from the spirit and scope of the present invention.

As best shown in FIG. 3, the proximal flange 204 comprises an interior opening 236, which is distally bounded by the mount plate 220 and peripherally bounded by the cylindrical portion 216. The interior opening 236 is formed such that an interior surface of the cylindrical portion 216 includes a plurality of threads 240, and the mount plate 220 includes a passage 244 from the interior opening 236 to an interior of the conduit 208. It will be appreciated that the cylindrical portion 216, the interior opening 236, and the plurality of threads 240 generally embody a female hose coupling. It will be further appreciated that the specific dimensions incorporated into the proximal flange 204, such as, by way of example, but not limited to, the diameter of the interior opening 236, a number of the threads 240, and a pitch of the threads 240, will depend upon the particular male hose fitting to which the proximal flange 204 is intended to be coupled. In one embodiment, the proximal flange 204 is configured to be coupled with a garden hose. In other embodiments, however, the proximal flange 204 may be configured for various types of water hoses other than a garden hose. In still other embodiments, the proximal flange 204 may be configured to be a threaded male hose coupling. In yet other embodiments, the proximal flange 204 may be configured to receive a push-on hose which may be fastened by way of a hose clamp.

With reference to FIGS. 2-3, the conduit 208 generally is an elongate member extending from the mount plate 220 to the distal end portion 212. In the illustrated embodiment, the conduit 208 comprises a top wall 248, a bottom wall 252, a front wall 256, a back wall 260, and a distal cap 264. All the walls comprising the conduit 208 are joined by intervening rounded edges 268. The rounded edges 268 are smooth so as to eliminate sharp edges which may otherwise damage the air filter 108 during cleaning. As shown in FIG. 2, the front wall 256 comprises a plurality of vents 272 which are in fluid communication with the interior of the conduit 208. Those skilled in the art will recognize that the plurality of vents 272 serve to allow water passed into the conduit 208 by way of the passage 244 to exit the conduit 208 as a plurality of pressurized water streams disposed along the distal end portion 212 so as to advantageously clean the air filter 108.

In the illustrated embodiment of FIG. 2, seventeen individual vents 272 are longitudinally arranged uniformly along the distal end portion 212 of the front wall 256. Each of the individual vents 272 generally is a circular opening in the front wall 256 of the conduit. In other embodiments, however, more or less than seventeen individual vents 272 may be disposed on the conduit 208. It should be further understood that the individual vents 272 may be comprised of shapes, sizes, and arrangements other than as shown in FIG. 2, without deviating from the spirit and scope of the present invention. In another embodiment, the conduit may include various components and mechanisms such that at least some of the individual vents 272 have adjustable shapes and sizes. It will be recognized that adjustable vents 272 enable a user of the air filter cleaning wand to alter the form of the pressurized water streams issued from the vents 272. Furthermore, in the illustrated embodiment of FIGS. 2-4, the walls 248, 252, 256, and 260 give the conduit 208 a generally trapezoidal cross-sectional shape. It should be recognized that the conduit 208 need not be limited to the trapezoidal cross-sectional shape, but may include other shapes, including, but not necessarily limited to, rectangular, triangular, circular, ellipsoidal, polygonal, and the like.

One embodiment of a method for cleaning the air filter 108 comprises rotating the proximal flange 204 onto the male connector of a garden hose so as to tightly engage the threads 240 with the threads of the male connector. The air intake conduit of the automobile is then removed from the conduit 120, thereby exposing the interior cavity 136 of the air filter 108. An air filter cleaner may be sprayed onto both sides of the filter material 156 and allowed to soak into the filter material 156 for a predetermined time period so as to loosen contaminants trapped within the filter material 156. The distal end portion 212 is then inserted into the interior cavity 136 of the air filter 108. Upon passing water into the garden hose, and then into the conduit 208 by way of the passage 244, the water exits the conduit 208 by way of the plurality of vents 272 in the form of pressurized water streams disposed along the distal end portion 212. The pressurized water streams are then used to flush contaminants from the filter material 156. It is envisioned that the conduit 208 may be advantageously rotated by hand to direct the pressurized water streams around the circumference of the filter material 156 so as to flush the entirety of the air filter 108. The water and filter contaminants then drain from a bottom portion of the air filter 108 and exit the engine bay. Where the air filter 108 is of the oiled variety, once the air filter is completely dry, air filter oil may be uniformly applied and allowed to wick into the filter material 156. Other methods for using the air filter cleaning wand 200 to clean the air filter 108 will be apparent to those skilled in the art without deviating from the spirit and scope of the present invention.

While some specific embodiments of the present invention have been shown the invention is not to be limited to these embodiments. For example, most functions performed by electronic hardware components may be duplicated by software emulation. Thus, a software program written to accomplish those same functions may emulate the functionality of the hardware components in input-output circuitry. The present invention is to be understood as not limited by the specific embodiments described herein, but only by scope of the appended claims.

The invention claimed is:

1. An apparatus for an air filter cleaning wand for flushing contaminants from an intake air filter of an automobile engine, the apparatus comprising:
   a proximal flange configured to receive a nozzle of a water hose;
   a mounting plate on the proximal flange and a plurality of transitions joined to the mounting plate;
   a conduit comprising an elongate member extending from the proximal flange to a distal end cap, where an interior of the conduit is in fluid communication with an interior opening of the proximal flange, the conduit comprising a trapezoidal cross-sectional shape, and
   a distal end portion of the conduit comprising a plurality of longitudinally aligned vents in fluid communication with the interior of the conduit;
   where upon passing water through the water hose and into the conduit, the water exits the plurality of vents in the form of pressurized water streams suitably disposed along the distal end portion to flush contaminants from a filter material of an air filter.

2. The apparatus of claim 1, wherein the air filter cleaning wand is comprised of a material which is sufficiently durable and temperature resistant to retain its configuration during operation when coupled with a pressurized water source, such as a garden hose.

3. The apparatus of claim 1, wherein the conduit comprises a top wall, a bottom wall, a front wall, a back wall, and a distal cap, all of which walls being joined by intervening rounded edges so as to eliminate sharp edges which may otherwise damage the air filter during cleaning.

4. The apparatus of claim 1, wherein the conduit has a cross-sectional shape comprising rectangular, triangular, circular, ellipsoidal, or polygonal.

5. The apparatus of claim 1, wherein the proximal flange comprises a cylindrical portion and a mount plate joined by a smooth transition.

6. The apparatus of claim 5, wherein the interior opening of the proximal flange is distally bounded by a mount plate and peripherally bounded by the cylindrical portion, where the interior opening is formed such that an interior surface of the cylindrical portion includes a plurality of threads, and the mount plate includes a passage from the interior opening to an interior of the conduit.

7. The apparatus of claim 6, wherein the proximal flange further comprises a plurality of grip structures disposed around the periphery of the cylindrical portion.

8. The apparatus of claim 7, wherein specific dimensions incorporated into the proximal flange depend upon a particular male hose fitting to which the proximal flange is intended to be coupled.

9. The apparatus of claim 1, wherein the proximal flange is configured to be coupled with a garden hose.

10. The apparatus of claim 9, wherein the proximal flange is a threaded female hose coupling.

11. The apparatus of claim 9, wherein the proximal flange is a threaded male hose coupling.

12. The apparatus of claim 9, wherein the proximal flange is configured to receive a push-on hose and fastened by way of a hose clamp.

13. The apparatus of claim 1, wherein the plurality of vents is longitudinally arranged and uniformly spaced along the distal end portion of the conduit.

14. The apparatus of claim 1, wherein each of the plurality of vents comprises a circular opening in the front wall of the conduit.

15. The apparatus of claim 13, wherein each of the plurality of vents comprises an opening having a shape comprising rectangular, triangular, ellipsoidal, or polygonal.

16. The apparatus of claim 13, wherein a portion of the plurality of vents have adjustable shapes so as to alter the form of the pressurized water streams issued from the vents.

17. A method for cleaning an air filter which is installed within an engine bay of an automobile, the method comprising:

rotating a proximal flange of an air filter cleaning wand onto a male connector of a water hose so as to tightly engage threads of the proximal flange with threads of the male connector so as to establish a tight coupling of the air filter cleaning wand and the water hose; a distal end portion of a conduit comprising a plurality of longitudinally aligned vents in fluid communication with the interior of the conduit, the conduit comprising a trapezoidal cross-sectional shape;

removing an air intake conduit of the automobile from the air filter, thereby exposing an interior cavity of the air filter;

inserting a distal end portion of the air filter cleaning wand into the interior cavity of the air filter;

passing water into the water hose, and then into a conduit of the air filter cleaning wand, such that the water exits the conduit by way of a plurality of longitudinally aligned vents in the form of pressurized water streams disposed along the distal end portion;

using the pressurized water streams to flush contaminants from a filter material of the air filter;

allowing the water and contaminants to drain from a bottom portion of the air filter and exit the engine bay; and allowing the air filter to become dry.

18. The method of claim 17, wherein using the pressurized water streams further comprises rotating the conduit by hand to direct the pressurized water streams around the circumference of the filter material so as to flush the entirety of the air filter.

19. The method of claim 17, wherein removing an air intake conduit further comprises spraying an air filter cleaner onto both sides of the filter material and allowing the air filter cleaner to soak into the filter material for a predetermined time period so as to loosen contaminants from the filter material.

20. The method of claim 19, wherein allowing the air filter to become dry further comprises uniformly applying air filter oil to the filter material and allowing the air filter oil to wick into the filter material.

* * * * *